US 12,418,389 B2

(12) United States Patent
Choi

(10) Patent No.: US 12,418,389 B2
(45) Date of Patent: Sep. 16, 2025

(54) ELECTRONIC DEVICE FOR CONTROLLING STRENGTH OF WIRELESS SIGNAL AND OPERATING METHOD THEREOF

(71) Applicant: Samsung Electronics Co., Ltd., Gyeonggi-do (KR)

(72) Inventor: Jongwoo Choi, Gyeonggi-do (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 364 days.

(21) Appl. No.: 17/741,538

(22) Filed: May 11, 2022

(65) Prior Publication Data

US 2022/0368510 A1 Nov. 17, 2022

Related U.S. Application Data

(63) Continuation of application No. PCT/KR2022/006111, filed on Apr. 28, 2022.

(30) Foreign Application Priority Data

May 12, 2021 (KR) ........................ 10-2021-0061247

(51) Int. Cl.
*H04L 12/00* (2006.01)
*H04B 1/00* (2006.01)
(Continued)

(52) U.S. Cl.
CPC ......... *H04L 5/1461* (2013.01); *H04B 1/0064* (2013.01); *H04L 5/0048* (2013.01); *H04L 5/006* (2013.01)

(58) Field of Classification Search
CPC ..... H04L 5/1461; H04L 5/0048; H04L 5/006; H04B 1/0064

See application file for complete search history.

(56) References Cited

U.S. PATENT DOCUMENTS 8,831,528 B2 9/2014 Shi
9,191,050 B1\* 11/2015 Hwang ................. H04B 1/525
(Continued)

FOREIGN PATENT DOCUMENTS

KR 10-1663146 B1 9/2016
KR 10-2018-0028801 A 3/2018

OTHER PUBLICATIONS

International Search Report dated Aug. 4, 2022.

*Primary Examiner* — Noel R Beharry
*Assistant Examiner* — Lionel Preval
(74) *Attorney, Agent, or Firm* — Cha & Reiter, LLC.

(57) ABSTRACT

An electronic device includes at least one hardware element, a wireless communication circuit that supports time division duplexing (TDD) communication, a plurality of antennas, a processor, and a memory storing reference strength information. The processor may be configured to identify a victim in operation in the at least one hardware element, and identify at least one first antenna operating as an aggressor against the victim in the plurality of antennas. When the at least one first antenna transmits a wireless signal, the processor may be configured to identify a ratio of uplink symbols for a specified time period, identify a first reference strength based on the ratio, identify a second reference strength based on the reference strength information, and transmit the wireless signal based on a result of comparing the first reference strength with the second reference strength.

18 Claims, 7 Drawing Sheets

(51) Int. Cl.
*H04L 5/00* (2006.01)
*H04L 5/14* (2006.01)

(56) References Cited

U.S. PATENT DOCUMENTS

| | | | |
|---|---|---|---|
| 10,038,465 | B2 | 7/2018 | Park et al. |
| 10,098,127 | B2 | 10/2018 | Kumar et al. |
| 10,574,276 | B2 | 2/2020 | Yoo et al. |
| 2013/0155884 | A1* | 6/2013 | Wang ................ H04W 72/1215 370/252 |
| 2014/0213210 | A1* | 7/2014 | Li ........................... H04B 1/12 455/296 |
| 2016/0065251 | A1* | 3/2016 | Yoo ......................... H04B 1/10 455/114.3 |
| 2017/0373712 | A1* | 12/2017 | Kim .................... H04B 7/0834 |
| 2018/0070364 | A1* | 3/2018 | Varanese ............. H04B 1/1027 |
| 2020/0021327 | A1 | 1/2020 | Ciccarelli et al. |
| 2022/0353875 | A1* | 11/2022 | Jiang ........................ H04L 5/14 |

\* cited by examiner

ELECTRONIC DEVICE FOR CONTROLLING STRENGTH OF WIRELESS SIGNAL AND OPERATING METHOD THEREOF

CROSS-REFERENCE TO RELATED APPLICATION(S)

This application is a continuation of International Application No. PCT/KR2022/006111, which was filed on Apr. 28, 2022, and claims priority to Korean Patent Application No. 10-2021-0061247, filed on May 12, 2021, in the Korean Intellectual Property Office, the disclosure of which are incorporated by reference herein their entirety.

BACKGROUND

Technical Field

One or more embodiments of the instant disclosure generally relate to an electronic device capable of controlling the strength of its wireless signal and an operating method thereof.

Description of Related Art

For communication with an external device, an electronic device may radiate wireless signal(s) as electromagnetic waves by using an antenna. Electromagnetic waves radiated from the electronic device may be harmful to the human body. This harm may be tracked by using specific absorption rate (SAR). The SAR is a rate at which electromagnetic waves radiated from an electronic device are absorbed by living tissues, and authorities in different jurisdictions manage the degree of harm to the human body by implementing various SAR standards. In order to satisfy the SAR standard, a manufacturer may reduce the strength of electromagnetic waves radiated from the electronic device to a level that is not harmful to the human body or may specifically design the structure of the radiator (antenna) so that harm may be minimized.

To lower the strength of the electromagnetic waves, a time-averaged SAR (TAS) algorithm may be applied to electronic devices. The TAS algorithm may refer to an algorithm that controls the output of an electronic device to satisfy the SAR standard in units of a specified time period (e.g., 100 secs in United States, 360 secs in Canada). Because the TAS algorithm satisfies SAR standard by calculating the strength of electromagnetic waves emitted on average for a certain time period, the TAS algorithm may be useful for electronic devices that emit a large amount of electromagnetic radiation. For example, the TAS algorithm may be useful for an electronic device having a plurality of antennas.

SUMMARY

Malfunction of hardware included in an electronic device may occur due to wireless signals radiated from an antenna of the electronic device.

According to an aspect of the disclosure, an electronic device include at least one hardware element including circuitry, a wireless communication circuit that supports time division duplexing (TDD) communication, a plurality of antennas, a processor, and a memory that is electrically connected to the at least one hardware element, the wireless communication circuit, the plurality of antennas, and the processor, and stores reference strength information and instructions, wherein the instructions, when executed by the processor, may cause the electronic device to identify a victim in operation in the at least one hardware element, and identify at least one first antenna operating as an aggressor against the victim in the plurality of antennas, and wherein, when the at least one first antenna transmits a wireless signal, the instructions, when executed by the processor, may cause the electronic device to identify a ratio of uplink symbols for a specified time period, identify a first reference strength based on the ratio, identify a second reference strength based on the reference strength information, and transmit the wireless signal based on a result of comparing the first reference strength with the second reference strength.

According to another aspect of the disclosure, a method of operating an electronic device includes identifying a victim in operation in at least one hardware element, and identifying at least one first antenna operating as an aggressor against the victim in a plurality of antennas, wherein, when the at least one first antenna transmits a wireless signal, the method may further include identifying a ratio of uplink symbols for a specified time period, identifying a first reference strength based on the ratio, identifying a second reference strength based on reference strength information, and transmitting the wireless signal based on a result of comparing the first reference strength with the second reference strength.

BRIEF DESCRIPTION OF DRAWINGS

With regard to description of drawings, the same or similar elements may be marked by the same or similar reference numerals.

DETAILED DESCRIPTION

Herein disclosed in a method of adaptively controlling the strength of wireless signals in order to prevent malfunction of hardware while one or more particular SAR standard are satisfied.

According to one or more embodiments disclosed herein, the electronic device may have improved performance by adaptively controlling the strength of wireless signals.

Figure 1:
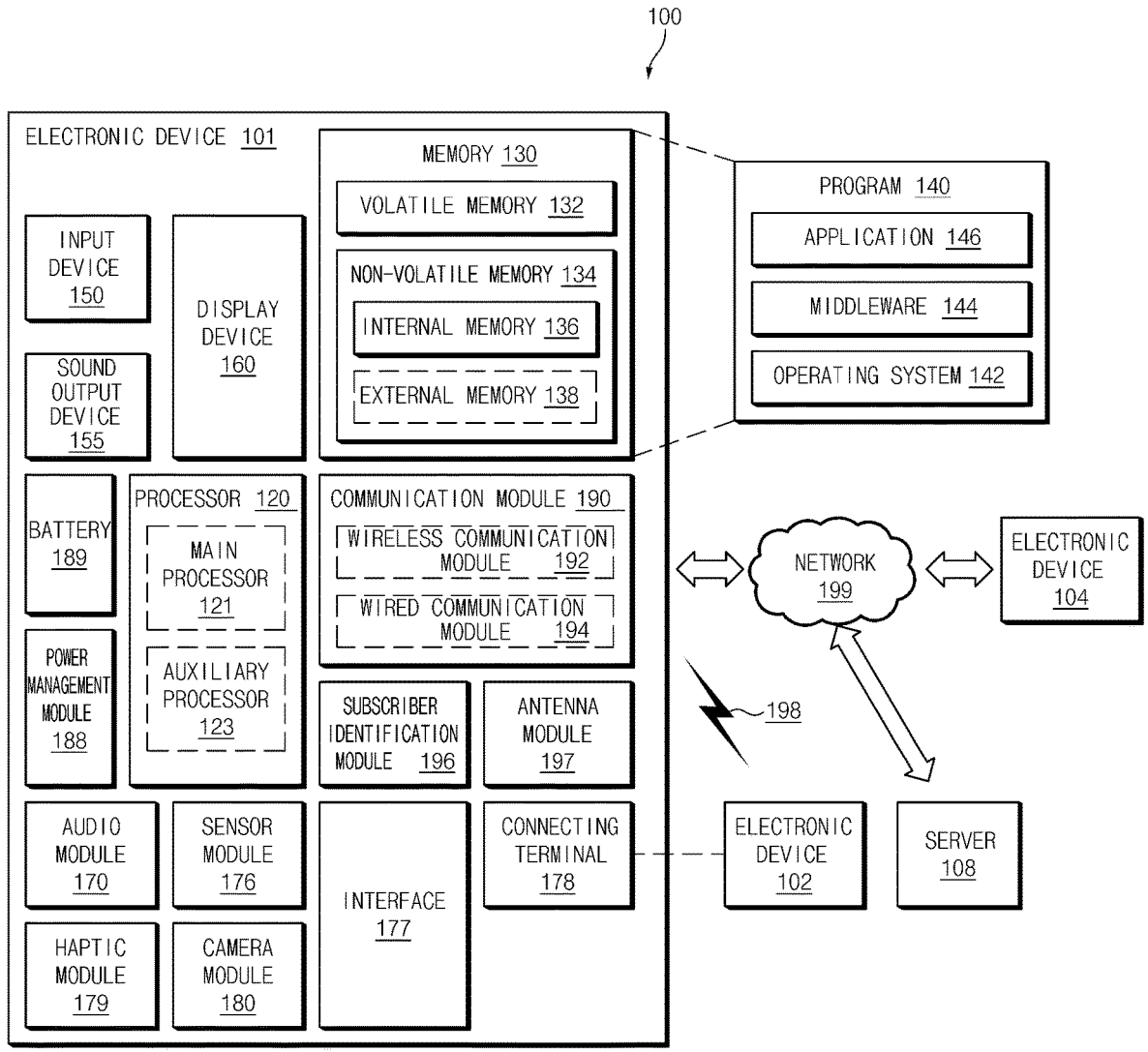
FIG. 1 is a block diagram illustrating an electronic device 101 in a network environment 100 according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
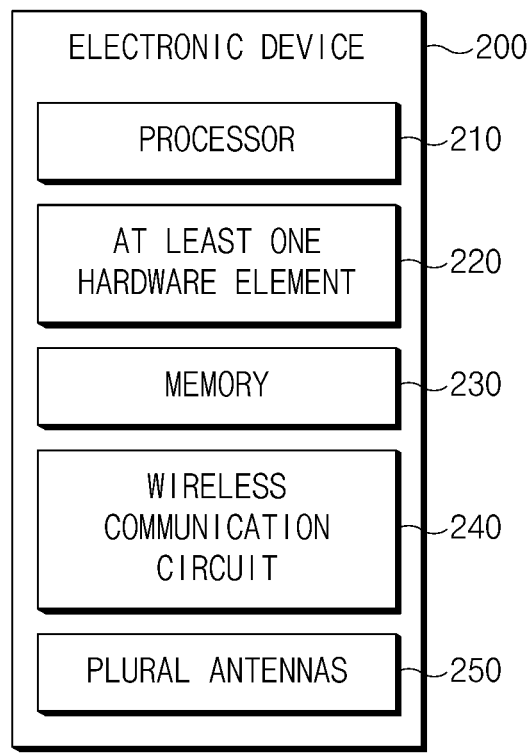
FIG. 2 is a block diagram illustrating an electronic device according to an embodiment of the disclosure.

Referring to FIG. 2, an electronic device 200 may include a processor 210, at least one hardware element 220, a memory 230, a wireless communication circuit 240, and/or a plurality of antennas 250. The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

In an embodiment, the at least one hardware element 220 may correspond to at least some of the hardware components shown in FIG. 1. In an embodiment, the at least one hardware element 220 may include a circuit element. For example, the at least one hardware element 220 may correspond to the display module 160, the sensor module 176, the interface 177, or a combination thereof.

In an embodiment, the processor 210 may generate a wireless signal through the wireless communication circuit 240. In an embodiment, the wireless signal generated by the wireless communication circuit 240 may be based on the time domain duplex (TDD) scheme.

In an embodiment, the TDD scheme may be a communication scheme that uses common frequency for downlink and uplink. For example, the frequency band supporting the TDD scheme may be about 2.6 GHz. As another example, the frequency band supporting the TDD scheme may be 3.5 GHz or higher.

In an embodiment, the processor 210 may radiate the generated wireless signal to its external environment through the plurality of antennas 250.

In an embodiment, when the strength of the wireless signal radiated from at least one of the plurality of antennas 250 is above a certain level, malfunction may be caused in some of the at least one hardware element 220. For example, the signal obtained from at least one sensor (e.g., the sensor module 176) may be distorted by the wireless signal radiated from at least one of the plurality of antennas 250. In another example, a high-speed interface connected to the camera module 180 or the display module 160 may be interfered with by the wireless signal radiated from at least one of the plurality of antennas 250. In this case, overflow or underflow may occur in a data packet transmitted through the high-speed interface. As a result, distortion or stoppage of content displayed through the display of the electronic device 200 may occur.

Hereinafter, when at least one of the plurality of antennas 250 radiates a wireless signal, the part of the at least one hardware element 220 that may malfunction due to the signal may be referred to as the victim, and at least one of the plurality of antennas 250 radiating the wireless signal may be referred to as the aggressor.

In an embodiment, the antenna operating as the aggressor against the victim may be determined in advance. For example, whether a particular antenna is the aggressor against a victim may be determined experimentally. In another example, whether a particular antenna is the aggressor against a victim may be determined based on the distance between the victim and the aggressor antenna.

Figure 3:
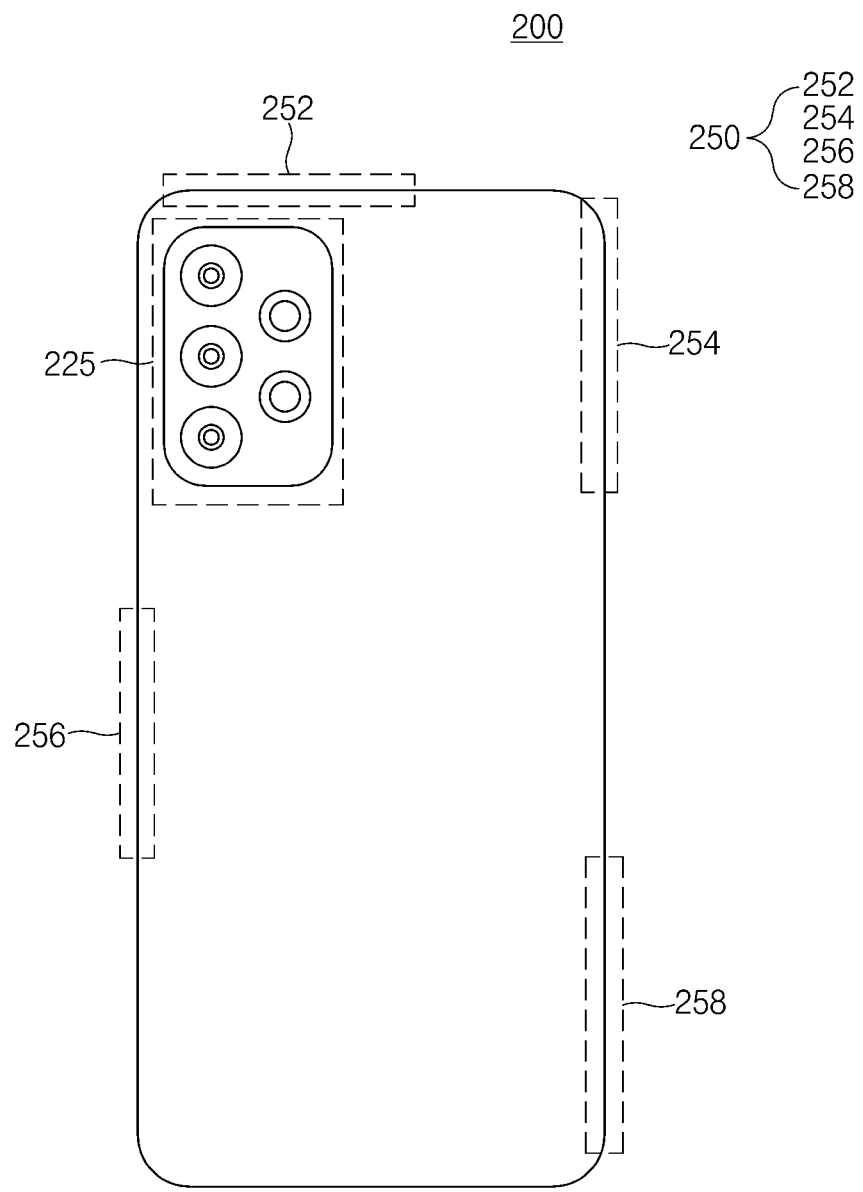
FIG. 3 is a diagram illustrating an electronic device according to an embodiment of the disclosure.

Referring to FIG. 3, a first antenna 252, a second antenna 254, a third antenna 256, and/or a fourth antenna 258 may be arranged in areas of the housing of the electronic device 200. The first antenna 252, the second antenna 254, the third antenna 256, and the fourth antenna 258 may constitute the plurality of antennas 250. In an embodiment, a camera module 225 may be an example of the at least one hardware element 220.

In an embodiment, when the strength of a wireless signal radiated from at least one of the plurality of antennas 250 (e.g., the first antenna 252) is higher than or equal to a certain level, malfunction of the camera module 225 may occur. In this case, the camera module 225 may be the victim, and the first antenna 252 may be the aggressor.

Referring back to FIG. 2, the memory 230 may store mapping information between the victim and the aggressor. The mapping information may include information of an antenna capable of operating as the aggressor against a victim (e.g., the at least one hardware element 220). In an embodiment, the processor 210 may identify which antenna is the aggressor based on the mapping information.

In an embodiment, the memory 230 may store reference strength information and time-average reference strength information. For example, the reference strength information may be a preset strength so that malfunction of an operating victim does not occur. For example, the time-average reference strength information may be a preset strength such that wireless signal radiated from the electronic device 200 meets a specific absorption rate (SAR) standard for a certain time period.

In an embodiment, the processor 210 may adjust the strength of the generated wireless signal. For example, the processor 210 may control the wireless communication circuit 240 such that the strength of the wireless signal radiated from the electronic device 200 meets the SAR standard. For example, the processor 210 may control the wireless communication circuit 240 such that malfunction of the victim does not occur due to the wireless signal radiated from the aggressor. Hereinafter, the method of controlling the strength of the wireless signal will be described.

In an embodiment, the processor 210 may identify a part (hereinafter, referred to as the victim) of the at least one hardware element 220 that is currently operating. The processor 210 may identify at least one antenna (hereinafter, referred to as the aggressor) in the plurality of antennas 250 that is operating as the aggressor against the victim. This identification may be done based on the mapping information.

In an embodiment, the processor 210 may control the wireless communication circuit 240 to generate wireless signal based on a first reference strength, a second reference strength, or a combination thereof.

In an embodiment, the processor 210 may identify the first reference strength based on a duty cycle. For example, the first reference strength may be calculated based on following Equation 1.

$$\text{First reference strength} = S_{avg} + 10 \times \log\left(\frac{100}{S_d(\%)}\right) \quad \text{[Equation 1]}$$

In Equation 1, Savg may be a time-averaged reference strength, and Sd may be a duty cycle.

In an embodiment, the duty cycle may be determined based on the length of the transmission period of the wireless communication performed by the wireless communication circuit 240. For example, the duty cycle may be the ratio of the number of uplink symbols in the symbols of a frame in the TDD scheme. Hereinafter, the duty cycle will be described with reference to FIG. 4.

Figure 4:
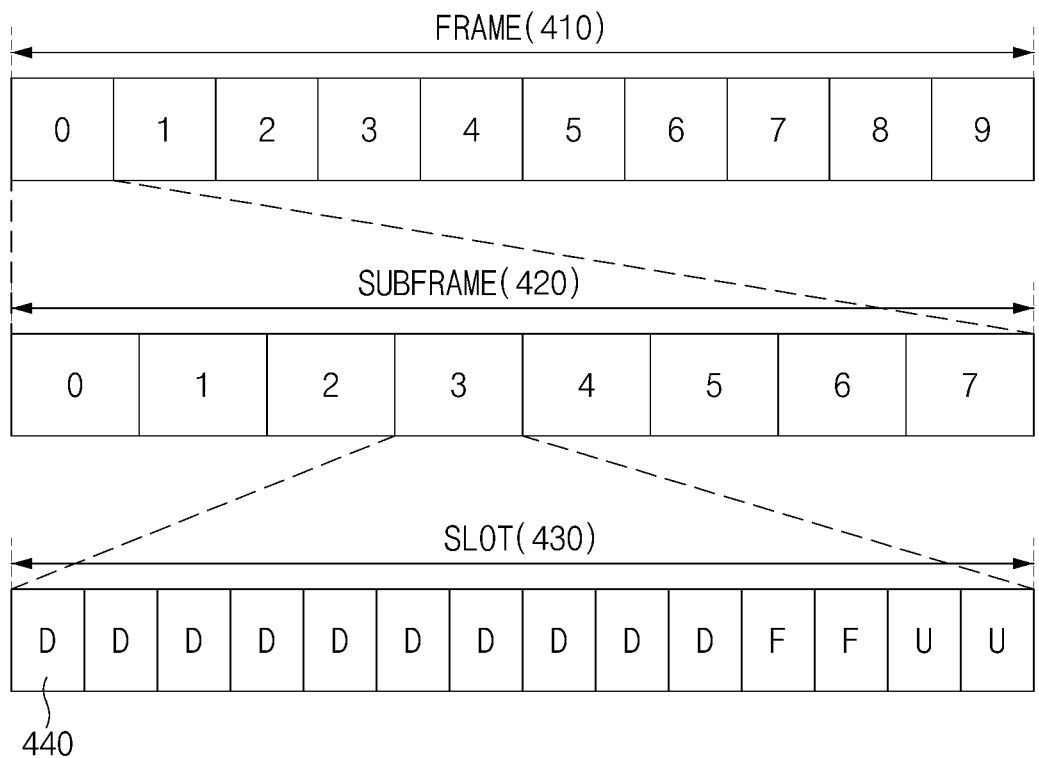
FIG. 4 is a diagram illustrating a frame structure in a time domain in TDD scheme according to an embodiment of the disclosure.

Referring to FIG. 4, the time domain in the TDD scheme may have a frame structure. The frame structure of FIG. 4 may be based on the New Radio (NR) standard. However, in another embodiment not shown in FIG. 4, the frame structure may be defined differently in, for example, the Long Term Evolution (LTE) standard.

In an embodiment, the frame structure may include a frame 410, a subframe 420, slots 430, and orthogonal frequency division multiplexing (OFDM) symbols 440 (hereinafter, referred to as symbols). In an embodiment, the length of one frame 410 may be 10 ms, and the length of one subframe 420 may be 1 ms. In an embodiment, the time corresponding to each of the slot 430 and the symbol 440 may be determined based on subcarrier spacing.

In an embodiment, setting related to the frame structure may be based on a control signal (e.g., radio resource control (RRC)) received from a base station. In an embodiment, the wireless communication circuit 240 may receive the control signal (e.g., RRC) from the base station for network connection with the base station. For example, the RRC signal may include information about establishment or release of the connection between the electronic device 200 and the base station. For example, the RRC signal may include setting information for a transmission section and a reception section. FIG. 4 may illustrate the frame structure configured based on the control signal shown in Table 1.

TABLE 1 tdd-UL-DL-ConfigurationCommon
{
referenceSubcarrierSpacing kHz120,
pattern1
{
dl-UL-TransmissionPeriodicity ms0p625,
nrofDownlinkSlots 3,
nrofDownlinkSymbols 10,
nrofUplinkSlots 1,
nrofUplinkSymbols 2
}
}

Referring to Table 1, the subcarrier spacing may be set to 120 kHz. When the subcarrier spacing is 120 kHz according to a predefined standard (e.g., 3GPP), the length of one slot 430 may be set to be 0.125 ms. In an embodiment, one frame 410 may include ten subframes 420. In an embodiment, one subframe 420 may include eight slots 430. In an embodiment, one slot 430 may include 14 symbols 440.

In an embodiment, a symbol may be the smallest unit of the time domain in the TDD scheme. The OFDM symbol may be one of U, D or F. For example, 'U' may refer to an uplink symbol. For example, 'D' may refer to a downlink symbol. For example, 'F' may refer to a flexible symbol. The flexible symbol may be an uplink symbol or a downlink symbol depending on how the base station allocates it.

Based on the control signal, a transmission period (e.g., specified time period) of wireless communication performed by the wireless communication circuit 240 may be set to 0.625 ms. For example, one period may include 5 slots. In such case, one period may include 70 symbols.

Based on the control signal, three of the five slots included for one period may be downlink slots and one may be an uplink slot. In a downlink slot (e.g., slot number 0, 1 and 2), all symbols constituting the slot are downlink symbols. In an uplink slot (e.g., slot number 4), all symbols constituting the slot are uplink symbols.

In an embodiment, one of the five slots included in one period (e.g., slot number 3) may include 10 downlink symbols and 2 uplink symbols. For example, 10 downlink symbols from left to right and 2 uplink symbols from right to left may be allocated to the slot 430. Flexible symbol may be allocated to regions to which downlink symbols and uplink symbols are not allocated in the slot.

In an embodiment, the duty cycle may be defined as the ratio of the number of uplink symbols to the total number of symbols during a specified time period (e.g., 0.625 ms). In an embodiment shown in FIG. 4, because the total number of slots is 70 and the number of uplink symbols is 16, the duty cycle may be 16/70*100(%), that is, 23%.

Referring back to FIG. 2, the processor 210 may identify a first reference strength using the duty cycle identified based on the control signal and the time-average reference strength obtained from the memory 330.

In an embodiment, the processor 210 may identify a second reference strength based on the reference strength information obtained from the memory 330. For example, the processor 210 may identify a previously specified reference strength based on the usage environment of the electronic device 200 as the second reference strength.

In an embodiment, the processor 310 may compare the identified first reference strength with the second reference strength. The processor 310 may identify the strength of the wireless signal radiated from the electronic device 200 based on the comparison result.

In an embodiment, when the first reference strength is higher than the second reference strength, the processor 210 may control the wireless communication circuit 240 to generate a wireless signal based on the second reference strength. In an embodiment, when the first reference strength is not higher than the second reference strength, the processor 210 may control the wireless communication circuit 240 to generate a wireless signal based on the first reference strength. Hereinafter, a method of identifying the strength of a wireless signal according to a duty cycle will be described with reference to FIG. 5.

Figure 5:
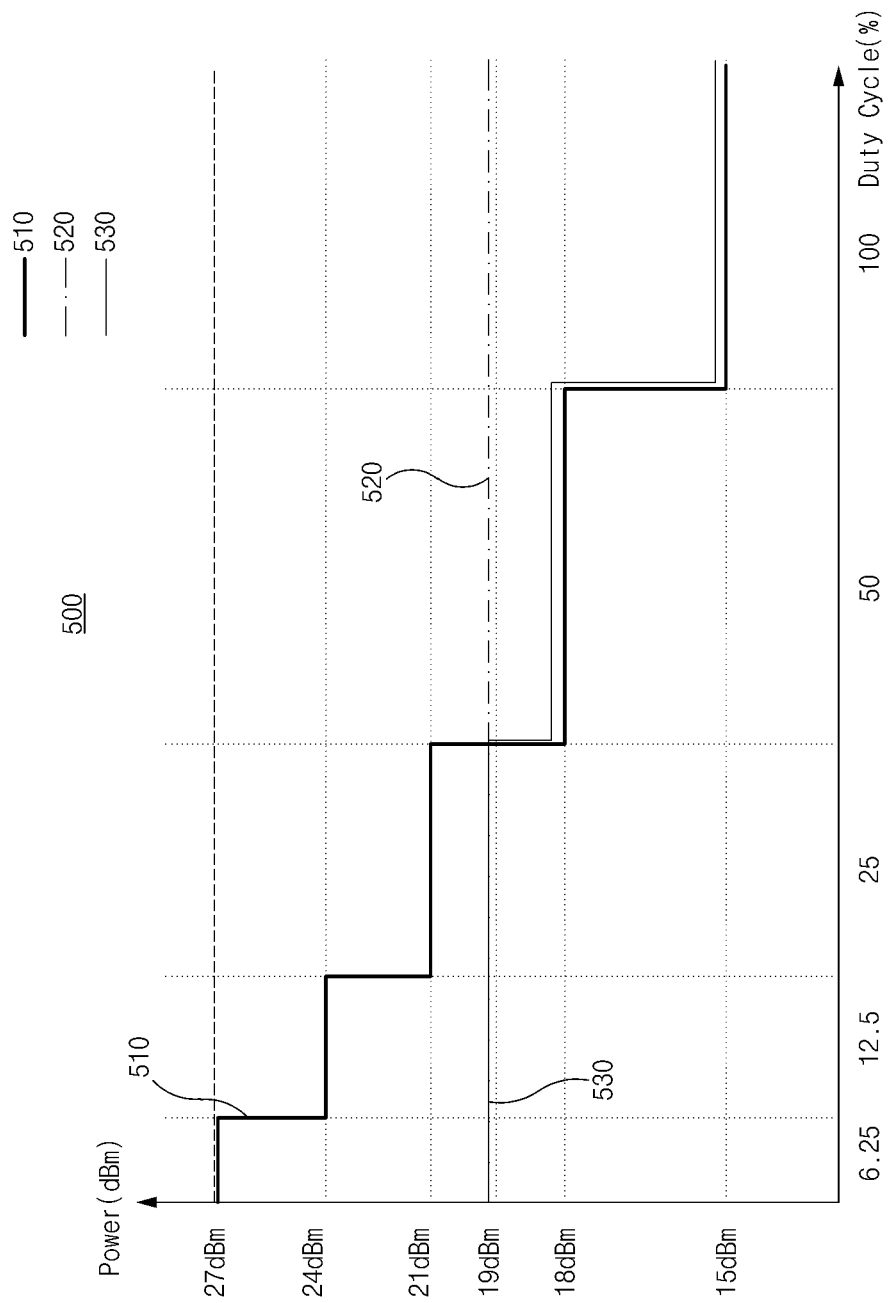
FIG. 5 is a graph illustrating a method of controlling the strength of a wireless signal according to an embodiment of the disclosure.

Referring to FIG. 5, the horizontal axis of the graph 500 may indicate the duty cycle (%), and the vertical axis may indicate the strength (dBm) of the wireless signal. Reference number 510 may indicate the first reference strength. Reference number 520 may indicate the second reference strength. Reference number 530 denotes the strength of the wireless signal identified based on the comparison result of the first and second reference strengths.

Referring to sections in which the duty cycle is 6.25%, 12.5% and 25%, the first reference strength 510 may be higher than the second reference strength 520. When the wireless communication circuit 240 generates wireless signals based on the first reference strength 510, malfunction of the victim may occur. Accordingly, the processor 310 may control the wireless communication circuit 240 to generate wireless signals based on the second reference strength 520.

Referring to the sections in which the duty cycle is 50% and 100%, the second reference strength 520 may be higher than the first reference strength 510. The processor 310 may control the wireless communication circuit 240 to generate wireless signals based on the first reference strength 510 in order to meet the SAR standard in the time domain. Although it is shown that there is a small difference between the strength 530 of the identified wireless signal and the second reference strength 520 on the graph 500, it may be understood that the strengths are substantially the same, i.e. sufficiently same such that signals with strength 520 and signals with strength 530 have the same network performance.

Referring back to FIG. 2, the processor 210 may control the wireless communication circuit 240 to generate wireless signal(s) based on a third reference strength identified based on a time averaged SAR (TAS) algorithm. In an embodiment, the TAS algorithm may be an algorithm that uniformly back-offs a specified strength (e.g., 2 dBm) from the time-average reference strength. In the TAS algorithm, the length of time in which the electronic device 200 transmits the wireless signal may not be considered.

In an embodiment, the processor 210 may control the wireless communication circuit 240 to generate the wireless signal based on the third reference strength, when the wireless signal to be generated is a wireless signal in the frequency division duplexing (FDD) scheme.

In an embodiment, the processor 210 may control the wireless communication circuit 240 to generate the wireless signal based on the third reference strength in the following cases, when the wireless signal to be generated is a wireless signal in the TDD scheme. For example, when the at least one hardware element 220 in operation is not identified, the processor 210 may control the wireless communication circuit 240 to generate wireless signal(s) based on the third reference strength. As another example, when the antenna operating as the aggressor against at least some of the at least one hardware element 220 in operation (e.g., victim) is not radiating wireless signal(s), the processor 210 may control the wireless communication circuit 240 to generate wireless signal(s) based on the third reference strength. As still another example, when the wireless signal to be generated is a specified wireless signal (e.g., sound reference signal (SRS)), the processor 210 may control the wireless communication circuit 240 to generate the wireless signal based on the third reference strength.

Hereinafter, when the signal generated from the wireless communication circuit 240 is an SRS, an antenna control method will be described.

Referring back to FIG. 3, the electronic device 200 including a plurality of antennas (e.g., 252, 254, 256, and 258) may use multi-input multi-output (MIMO) technology to increase communication capacity. In an embodiment, in order to improve the MIMO gain, the electronic device 200 may transmit the SRS to the base station by using the plurality of antennas 252, 254, 256, and 258. The base station may estimate a downlink channel for transmitting data to the electronic device 200 based on the SRS received from each antenna (e.g., the plurality of antennas 252, 254, 256, and 258) of the electronic device 200. For example, the base station may estimate the environment of at least one downlink channel based on the received signal strength of the SRS.

In an embodiment, the plurality of antennas 252, 254, 256, and 258 may sequentially transmit the SRS to the base station. For example, the processor 210 may sequentially transmit the SRS through the plurality of antennas 252, 254, 256 and 258 based on an antenna switching sequence. The antenna switching sequence may include the order in which the plurality of antennas 252, 254, 256, and 258 transmit the SRS.

In an embodiment, some (e.g., the first antenna 252) of the plurality of antennas 252, 254, 256, and 258 transmitting the SRS may operate as an aggressor against the victim (e.g., the camera module 225). In this case, the processor 210 may select another antenna to radiate the SRS from among the plurality of antennas 252, 254, 256, and 258 in order to minimize impact on the victim.

In an embodiment, the processor 210 may exclude the aggressor (e.g., the first antenna 252) from the antenna switching sequence. For example, the processor 310 may configure the antenna switching sequence with the remaining antennas (e.g., the second antenna 254, the third antenna 256 and the fourth antenna 258) other than for the aggressor. For example, in the antenna switching sequence, the aggressor (e.g., the first antenna 252) may be replaced with another antenna (e.g., the second antenna 254) next to the aggressor.

In an embodiment, the electronic device may include at least one hardware element including circuitry, a wireless communication circuit supporting TDD communication, a plurality of antennas, a processor, and a memory that is electrically connected to the at least one hardware element, the wireless communication circuit, the plurality of antennas, and the processor, and stores reference strength information and instructions. The instructions, when executed by the processor, may cause the electronic device to identify a victim in operation in the at least one hardware element and identify at least one first antenna operating as an aggressor against the victim in the plurality of antennas, and when the at least one first antenna transmits a wireless signal, the instructions may cause the electronic device to identify a ratio of uplink symbols for a specified time period, identify a first reference strength based on the ratio, identify a second reference strength based on the reference strength information, and transmit the wireless signal based on a result of comparing the first reference strength with the second reference strength.

In an embodiment, the instructions, when executed by the processor, may cause the electronic device to identify the second reference strength as a strength of the wireless signal when the first reference strength is higher than the second reference strength, and identify the first reference strength as the strength of the wireless signal when the first reference strength is lower than the second reference strength.

In an embodiment, the memory may further store mapping information of the victim and the aggressor, and the instructions, when executed by the processor, may cause the electronic device to identify the at least one first antenna based on the mapping information.

In an embodiment, the at least one hardware element may include at least one of a camera interface or a display interface.

In an embodiment, the instructions, when executed by the processor, may cause the electronic device to transmit a specified wireless signal by using one or more second antennas other than the at least one first antenna in the plurality of antennas when the wireless signal is the specified wireless signal.

In an embodiment, the specified wireless signal may include a sounding reference signal (SRS).

In an embodiment, the instructions, when executed by the processor, may cause the electronic device to identify a third reference strength based on a time averaging SAR (TAS) algorithm, and identify the third reference strength as a strength of the specified wireless signal.

In an embodiment, the control signal may be a radio resource control (RRC) signal.

In an embodiment, the instructions, when executed by the processor, may cause the electronic device to, when no victim is identified, identify a third reference strength based on a TAS algorithm, and transmit the wireless signal based on the third reference strength.

In an embodiment, the instructions, when executed by the processor, may cause the electronic device to, when no aggressor is identified, identify a third reference strength based on a TAS algorithm, and transmit the wireless signal based on the third reference strength.

Figure 6:
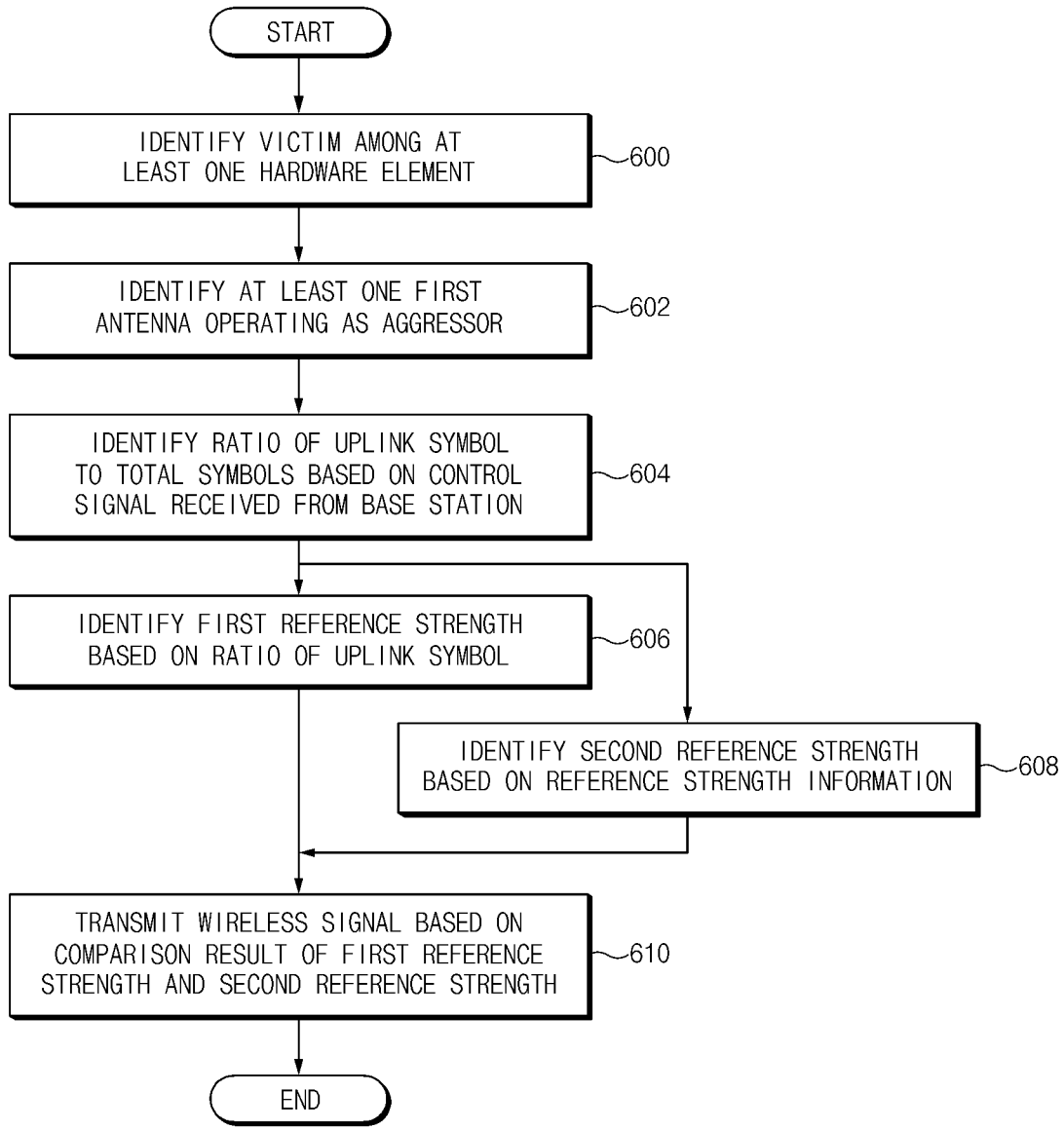
FIG. 6 is a graph illustrating an operation of controlling the strength of a wireless signal of an electronic device according to an embodiment of the disclosure.

FIG. 6 is a flowchart illustrating an operation of controlling the strength of a wireless signal of an electronic device according to an embodiment of the disclosure.

For the description of FIG. 6, the configurations of FIGS. 2 to 5 may be referred to.

In operation 600, the processor 210 may identify a victim among the one or more hardware elements 220. For example, the victim may be a hardware element among the at least one hardware element 220 that is currently in operation.

In operation 602, the processor 210 may identify at least one first antenna operating as the aggressor in the plurality of antennas 250. For example, the at least one first antenna may act as the aggressor against the victim identified in operation 600. In an embodiment, the processor 210 may identify the at least one first antenna based on the mapping information stored in the memory 330.

In operation 604, the processor 210 may identify a ratio of uplink symbols to total symbols exchanged with a base station in a given time period, based on a control signal (e.g., RRC) received from the base station. The description of the method of identifying the ratio of uplink symbols is made above in connection with FIG. 4.

In operation 606, the processor 210 may identify the first reference strength based on the ratio of uplink symbols. In an embodiment, the processor 210 may calculate (or identify) the first reference strength based on Equation 1.

In operation 608, the processor 210 may identify the second reference strength based on the reference strength information. In an embodiment, the reference strength information may include strength information specified in advance such that the victim does not malfunction. In an embodiment, the reference strength information may be stored in the memory 330.

In an embodiment, operations 606 and 608 may be performed simultaneously or sequentially, and the order of operations 606 and 608 may be reversed.

In operation 610, the processor 210 may transmit wireless signal(s) based on the comparison result of the first reference strength and the second reference strength.

In an embodiment, when the first reference strength is higher than the second reference strength, the processor 210 may control the wireless communication circuit 240 to generate wireless signal(s) based on the second reference strength. In this case, the strength of the wireless signal transmitted by the electronic device 200 may be the second reference strength.

In an embodiment, when the first reference strength is not higher than the second reference strength, the processor 210 may control the wireless communication circuit 240 to generate wireless signal(s) based on the first reference strength. In this case, the strength of the wireless signal transmitted by the electronic device 200 may be the first reference strength.

In an embodiment, the processor 210 may transmit wireless signal(s) by using a second antenna that is not the at least one first antenna (e.g., the aggressor) in the plurality of antennas 250. In this case, the processor 210 may control the wireless communication circuit 240 such that the strength of the wireless signal(s) transmitted through the second antenna is based on the third reference strength (e.g., determined based on the TAS algorithm). For example, the processor 210 may radiate wireless signal(s) through at least one first antenna based on the first or second reference strength, and may radiate wireless signal(s) through the second antenna based on the third reference strength. In this case, the wireless signal radiated through the at least one first antenna may be the same as or different from that radiated through the second antenna.

Figure 7:
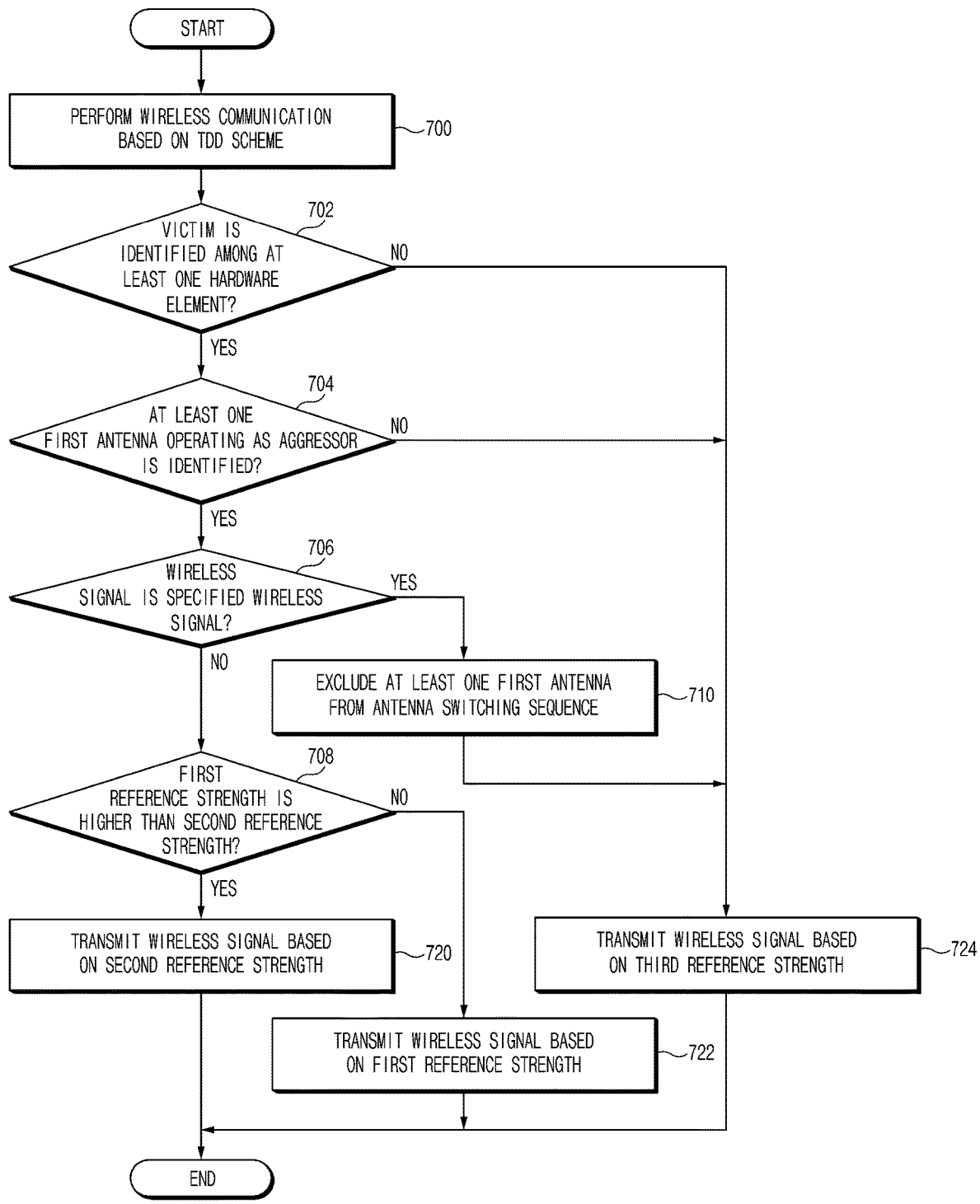
FIG. 7 is a flowchart illustrating a wireless signal transmission operation of an electronic device according to an embodiment of the disclosure.

FIG. 7 is a flowchart illustrating a wireless signal transmission operation of an electronic device according to an embodiment of the disclosure.

For the description of FIG. 7, the configurations of FIGS. 2 to 5 may be referred to.

In operation 700, the wireless communication circuit 240 may perform wireless communication based on the TDD scheme. The wireless communication in operation 700 may be communication based on the NR standard or the LTE standard.

In operation 702, the processor 210 may identify a victim among the one or more hardware elements 220. In an embodiment, the victim may be a hardware element among the at least one hardware elements 220 that is currently operating.

When the victim is not identified in operation 702 (NO), the processor 210 may proceed to operation 724.

In operation 724, the processor 210 may transmit wireless signal(s) based on the third reference strength. The third reference strength may be based on the TAS algorithm. The TAS algorithm may be an algorithm for uniformly backing off as much as a specified strength (e.g., 2 dBm) from the time-average reference strength.

When the victim is identified in operation 702 (YES), the processor 210 may proceed to operation 704. In operation 704, the processor 210 may identify at least one first antenna that operates as the aggressor. In an embodiment, the at least one first antenna may operate as the aggressor against the victim identified in operation 702.

When the at least one first antenna is not identified in operation 704 (NO), the processor 210 may proceed to operation 724.

When the at least one first antenna is identified in operation 704 (YES), the processor 210 may proceed to operation 706. In operation 706, the processor 210 may determine whether a wireless signal to be transmitted by the electronic device 200 is a specified wireless signal. For example, the specified wireless signal may be an SRS.

When the wireless signal to be transmitted is the specified wireless signal in operation 706 (YES), the processor 210 may proceed to operation 710. In operation 710, the processor 210 may exclude the at least one first antenna from the antenna switching sequence. In an embodiment, the processor 210 may transmit the SRS by using a second antenna in the plurality of antennas 250 that is not the at least one first antenna.

In an embodiment, after excluding the at least one first antenna from the antenna switching sequence, the processor 210 may proceed to operation 724. In operation 724, the processor 210 may transmit the wireless signal (e.g., SRS) based on the third reference strength through the second antenna.

When the wireless signal to be transmitted is not a specified wireless signal in operation 706 (NO), the processor 210 may proceed to operation 708. In operation 708, the processor 210 may determine whether the first reference strength is higher than the second reference strength. Descriptions of the first and second reference strengths are made in connection with FIG. 6.

When the first reference strength is higher than the second reference strength in operation 708 (YES), the processor 210 may proceed to operation 720. In operation 720, the processor 210 may transmit wireless signal(s) based on the second reference strength.

When the first reference strength is not higher than the second reference strength in operation 708 (NO), the processor 210 may proceed to operation 722. In operation 722, the processor 210 may transmit wireless signal(s) based on the first reference strength.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   at least one hardware element including circuitry;
   a wireless communication circuit configured to support time division duplexing (TDD) communication;
   a plurality of antennas;
   a processor; and
   a memory electrically connected to the at least one hardware element, the wireless communication circuit, the plurality of antennas, and the processor, and storing reference strength information and instructions,
   wherein the reference strength information indicates transmit strength associated with the at least one hardware element,
   wherein the instructions, when executed by the processor, cause the electronic device to:
      identify a victim in operation among the at least one hardware element;
      identify at least one first antenna operating as an aggressor against the victim among the plurality of antennas;
      measure a ratio of uplink symbols that are transmitted by the aggressor during a specified time period by the aggressor to a sum of the uplink symbols that are transmitted by the aggressor and downlink symbols that are received by the aggressor for a specified time period;
      identify a first reference strength by adding a value to a time-averaged reference strength, wherein the time-averaged reference strength is a preset strength for the wireless signal such that the wireless signal meets a specific absorption rate (SAR), the value being inversely related to the ratio;
      identify a second reference strength mapped to the victim from the reference strength information;
      in case that the first reference strength exceeds the second reference signal, transmit the wireless signal with a strength based on the second reference strength such that the victim is not malfunctioning; and
      in case that the first reference strength is equal to or less than the second reference signal, transmit the wireless signal with a strength based on the first reference strength such that transmit power of the wireless signal meets a SAR (specific absorption rate) regulation.

2. The electronic device of claim 1, wherein the memory further stores mapping information of the victim and the aggressor,
   wherein the instructions, when executed by the processor, cause the electronic device to:
   identify the at least one first antenna based on the mapping information.

3. The electronic device of claim 1, wherein the victim in operation includes a camera interface and/or a display interface.

4. The electronic device of claim 1, wherein the instructions, when executed by the processor, cause the electronic device to:
   in case that a specified wireless signal being transmitted, transmit the specified wireless signal by using one or more second antennas other than the at least one first antenna among the plurality of antennas.

5. The electronic device of claim 4, wherein the specified wireless signal is a sounding reference signal (SRS).

6. The electronic device of claim 4, wherein the instructions, when executed by the processor, cause the electronic device to:
   identify a third reference strength based on a time averaging SAR (TAS) algorithm; and
   identify the third reference strength as a strength of the specified wireless signal.

7. The electronic device of claim 1, wherein the instructions, when executed by the processor, cause the electronic device to:
   receive a control signal through the wireless communication circuit; and
   identify the ratio based on the control signal, and
   wherein the control signal is a radio resource control (RRC) signal.

8. The electronic device of claim 1, wherein the instructions, when executed by the processor, cause the electronic device to:
   based on that the victim is not identified,
      identify a third reference strength based on a TAS (Time Averaged Specific absorption rate) algorithm; and
      transmit the wireless signal based on the third reference strength.

9. The electronic device of claim 1, wherein the instructions, when executed by the processor, cause the electronic device to:
   based on that the at least one first antenna is not identified,
      identify a third reference strength based on a TAS algorithm; and transmit the wireless signal based on the third reference strength.

10. A method of operating an electronic device, the method comprising:

identifying a victim in operation among at least one hardware element of the electronic device;

identifying at least one first antenna operating as an aggressor against the victim among a plurality of antennas, wherein, when a wireless signal is transmitted through the at least one first antenna, the method further comprises:

measure a ratio of uplink symbols that are transmitted by the aggressor during a specified time period by the aggressor to a sum of the uplink symbols that are transmitted by the aggressor and downlink symbols that are received by the aggressor for a specified time period;

identifying a first reference strength by adding a value to a time-averaged reference strength, wherein the time-averaged reference strength is a preset strength for the wireless signal such that the wireless signal meets a specific absorption rate (SAR), the value being inversely related to the ratio;

identifying a second reference strength mapped to the victim from reference strength information indicating transmit strength associated with the at least one hardware element; and transmitting the wireless signal based on a result of a comparison between the first reference strength and the second reference strength, wherein the transmitting the wireless signal comprises:

in case that the first reference strength exceeds the second reference signal, transmitting the wireless signal with a strength based on the second reference strength such that the victim is not malfunctioning; and in case that the first reference strength is equal to or less than the second reference signal, transmitting the wireless signal with a strength based on the first reference strength such that transmit power of the wireless signal meets a SAR (specific absorption rate) regulation.

11. The method of claim 10, further comprising:
identifying the at least one first antenna based on mapping information.

12. The method of claim 10, wherein the victim in operation includes a camera interface and/or a display interface.

13. The method of claim 10, further comprising:
in case transmitting a specified wireless signal, transmitting the specified wireless signal by using one or more second antennas other than the at least one first antenna among the plurality of antennas.

14. The method of claim 13, wherein the specified wireless signal is a sounding reference signal (SRS).

15. The method of claim 13, further comprising:
identifying a third reference strength based on a time averaging SAR (TAS) algorithm; and
identifying the third reference strength as a strength of the specified wireless signal.

16. The method of claim 13, further comprising:
receiving a control signal; and
identifying the ratio based on the control signal,
wherein the control signal is a radio resource control (RRC) signal.

17. The method of claim 10, further comprising:
based on that the victim is not identified, identifying a third reference strength based on a TAS algorithm; and
transmitting the wireless signal based on the third reference strength.

18. The method of claim 10, further comprising:
based on that the at least one first antenna is not identified, identifying a third reference strength based on a TAS algorithm; and
transmitting the wireless signal based on the third reference strength.

* * * * *